(12) United States Patent
Reyhanloo (10) Patent No.: US 9,986,870 B2
(45) Date of Patent: Jun. 5, 2018

(54) DEVICE FOR PROVIDING LIQUID FOR A BEVERAGE MACHINE AND USE THEREOF

(71) Applicant: JURA Elektroapparate AG, Niederbuchsiten (CH)

(72) Inventor: Shahryar Reyhanloo, Immensee (CH)

(73) Assignee: JURA Elektroapparate AG, Niederbuchsiten (CH)

( * ) Notice: Subject to any disclaimer, the term of this patent is extended or adjusted under 35 U.S.C. 154(b) by 615 days.

(21) Appl. No.: 14/423,976

(22) PCT Filed: Aug. 28, 2013

(86) PCT No.: PCT/CH2013/000153
§ 371 (c)(1),
(2) Date: Feb. 25, 2015

(87) PCT Pub. No.: WO2014/032195
PCT Pub. Date: Mar. 6, 2014

(65) Prior Publication Data
US 2015/0245736 A1  Sep. 3, 2015

(30) Foreign Application Priority Data
Aug. 30, 2012  (EP) .................................... 12405093

(51) Int. Cl.
*A23F 5/00* (2006.01)
*A47J 31/56* (2006.01)
(Continued)

(52) U.S. Cl.
CPC .......... *A47J 31/56* (2013.01); *A47J 31/4457* (2013.01); *A47J 31/462* (2013.01); *A47J 31/60* (2013.01);
(Continued)

(58) Field of Classification Search
CPC ...... A47J 31/4457; A47J 31/462; A47J 31/60; A47J 31/605; B08B 3/08; C02F 1/00
(Continued)

(56) References Cited

U.S. PATENT DOCUMENTS 5,063,836 A   11/1991  Patel
6,164,189 A * 12/2000  Anson .................... A47J 31/56
                                                        222/146.5
6,401,729 B1  6/2002   Ford

FOREIGN PATENT DOCUMENTS

CN    101980641 A    2/2011
EP    2 363 051 A1   9/2011
(Continued)

OTHER PUBLICATIONS

International Preliminary Report on Patentability (Chapter II) for Application No. PCT/CH2013/000153 dated Oct. 10, 2014.
(Continued)

*Primary Examiner* — Phuong Nguyen
(74) *Attorney, Agent, or Firm* — Alston & Bird LLP (57) ABSTRACT

The invention relates to a device (100) for providing liquid for a beverage machine (110), comprising a water tank (10) having at least one water inlet (11) which can be connected in a controllable manner to a water connection in order to fill the water tank (10), a control device (30) for controlling the water inlet (11) that can be connected in a controllable manner, and at least one filling level sensor (41, 42) for generating a signal which indicates at least whether or not a first filling level of liquid inside the water tank (10) has been reached or exceeded. In order to achieve easier cleaning, in particular descaling of the device (100), the at least one filling level sensor (41, 42) can be or is connected to the control device (30) to transmit the signal and the control device (30) is designed to control the water inlet (11) according to the signal of the at least one filling level sensor
(Continued)

(41, 42) and according to at least one operating mode, wherein the operating mode is either a filling mode or an emptying mode. Furthermore, a controllable drainage device (44) for draining liquid from the water tank (10) is present.

13 Claims, 3 Drawing Sheets

(51) Int. Cl.
> *A47J 31/60* (2006.01)
> *A47J 31/44* (2006.01)
> *A47J 31/46* (2006.01)
> *B08B 3/08* (2006.01)
> *C02F 1/00* (2006.01)

(52) U.S. Cl.
> CPC ............... *A47J 31/605* (2013.01); *B08B 3/08* (2013.01); *C02F 1/00* (2013.01); *C02F 2303/22* (2013.01)

(58) Field of Classification Search
> USPC ..................... 99/280, 281, 282, 283, 323.2
> See application file for complete search history.

(56) References Cited

FOREIGN PATENT DOCUMENTS

| | | |
|---|---|---|
| WO | WO 00/47058 A1 | 8/2000 |
| WO | WO 03/002449 A1 | 1/2003 |
| WO | WO 2009/124786 A1 | 10/2009 |

OTHER PUBLICATIONS

International Search Report for Application No. PCT/CH2013/000153 dated Oct. 10, 2014.

* cited by examiner

DEVICE FOR PROVIDING LIQUID FOR A BEVERAGE MACHINE AND USE THEREOF

CROSS-REFERENCE TO RELATED APPLICATIONS

This application is a National Phase Entry of PCT Appl. No. PCT/CH2013/000153, filed on Aug. 28, 2013, which claims priority to European Application No. 12405093.1, filed Aug. 30, 2012, the contents of each of which are incorporated herein in their entirety.

FIELD OF THE INVENTION

The invention relates to a device for providing liquid for a beverage machine, in particular for a coffee machine or a coffee dispenser, as well as to the use of such a device in a coffee machine or a coffee dispenser.

BACKGROUND OF THE INVENTION

Devices for providing liquid, for example brewing liquid, which encompass a water tank, which serves as buffer storage and which is connected directly to a water connection by means of a water inlet, in particular to the potable water supply, or which is connected in intervals, respectively, are used in the semi-gastronomy and gastronomy field in beverage machines, in particular in coffee machines or coffee dispensers. By providing such a "fixed mains water supply", which can be controlled in intervals, fresh water can always be held available in the water tank, for example, for preparing a coffee beverage, which reduces possible compromise of taste due to stagnant water.

Devices for providing liquid for a beverage machine having a water tank, which can be connected directly to the potable water supply, which are known from the technical background, are hereby commonly provided with a working float switch or other sensor devices, which, when filling or refilling the water tank, respectively, via the fixed mains water supply, close a inlet valve, which is installed in the path between water connection and water inlet, by means of a reed switch, when a target water level has been reached, by interconnecting a suitable control device.

Document U.S. Pat. No. 6,401,729 B1 discloses a device for flushing or for cleaning reservoirs, in which beverages, such as coffee, tea or concentrated beverages are stored, wherein this device is to be suitable to be able to simultaneously flush two such reservoirs for beverages. The device known from U.S. Pat. No. 6,401,729 B1 encompasses a water tank (96) having at least one water inlet (104) for filling the water tank (96), which is connected to a water connection (100) via a valve (102). The water inlet (104) can be controlled via the valve (102) with the help of a control device (94). The control device fills the water tank (96) with pressurized water until a filling level sensor (106) outputs a signal, according to which the water tank (96) has reached or exceeded its first, that is, full, liquid filling level. For this purpose, the filling level sensor (106) is connected to the control device (94) electronically. This control device (94) is also designed to control the water inlet according to the signal of the at least one filling level sensor (106). According to U.S. Pat. No. 6,401,729 B1, the flushing water located in the water tank (96) is guided to a spray head (114) via an output line (108) as soon as a metering valve (100) is opened by means of the control device (94). The spray water is then introduced into the holder (20) via the spray head (114), whereby a brewing process is initiated, which will not be explained in detail herein. Even though U.S. Pat. No. 6,401,729 B1 describes a cleaning process, but said cleaning process does not serve to clean the water tank (96), but to clean the beverage reservoirs 24 or 26, respectively, that is, a possibility for emptying or cleaning the water tank (96), respectively, is not described.

For example, a coffee machine having a water tank, which is embodied as buffer storage and which encompasses two water level sensors, which are connected to a control unit, is known from U.S. Pat. No. 5,063,836. The inlet valve between the fixed mains water supply and the inlet of the water tank, thus the water inlet, is hereby opened as long as the lower water level sensor does not report that the filling level, on the level of which it is attached inside the water tank, has been reached or exceeded. To prevent that, due to a defect of the water level sensor or, if applicable, also due to a contamination or calcification, the inlet valve remains opens for such a long time that the water tank runs over, a second water level sensor, which is to ensure a closing of the inlet valve by transmitting a corresponding signal to the control device, as soon as a water filling level has been reached, on the level of which this second upper sensor is attached, is arranged above the first water level sensor.

Such devices, which are known from the state of the art, have the disadvantage that cleaning, for example in the form of descaling, is difficult. In the case of the devices, which are known from the state of the art, it is thus not possible to fill a descaling liquid having a predetermined concentration into the water tank up to a level, at which a substantially complete cleaning or descaling, respectively, of all of the components arranged inside the water tank is ensured. In the case of the devices, which are known from the state of the art, it is furthermore not possible to remove a cleaning or descaling liquid, respectively, in a concentrated manner and substantially completely from the water tank once it has been added.

SUMMARY OF VARIOUS EMBODIMENTS

The instant invention is based on the task of further developing a generic device for providing liquid for a beverage machine, in particular for a coffee machine or a coffee dispenser, in such a manner that a cleaning or descaling, respectively, is possible more easily and more thoroughly.

According to the invention, this task is solved by means of a device according to independent patent claim 1.

In particular, the task is solved in that a device is specified for providing liquid for a beverage machine, in particular for a coffee machine or a coffee dispenser, having a water tank having at least one water inlet being configured to be connected in a controllable manner to a water connection, in particular to an overpressure water connection and preferably to a potable water supply, in order to fill the water tank, a control device for controlling the water inlet being configured to be connected in a controllable manner and at least one filling level sensor for generating a signal, which indicates at least whether or not a first filling level of liquid inside the water tank has been reached or exceeded, wherein the at least one filling level sensor is configured to be connected or is connected to the control device to transmit the signal and wherein the control device is designed to control the water inlet according to the signal of the at least one filling level sensor and according to at least one operating mode, wherein the operating mode is either a filling mode or an emptying mode.

According to the invention, the device furthermore encompasses a controllable drainage device for draining liquid from the water tank, wherein, in the filling mode, the control device is furthermore designed to connect the water inlet to the water connection when the first filling level is not reached and not exceeded and, in the emptying mode, to interrupt a connection of the water inlet to the water connection independent from the first filling level, so as to provide for a complete emptying of the water tank by controlling the drainage device.

This has the particular advantage that, in a corresponding operating mode, the water tank can be emptied completely prior to a new filling, for example for ending a cleaning or descaling process, whereby compromise of taste, which might result, is minimized for a subsequent beverage order.

Provision is thus made, for example, for the at least one operating mode to be selectable from at least two or more operating modes of the device. For example, the device is embodied in such a manner that it can at least be operated either in a filling mode or in an emptying mode. In this case, provision is made for the "at least one operating mode" to be selectable from the two operating modes "filling mode" and "emptying mode", for example, so that the "at least one operating mode" is thus either a filling mode or an emptying mode of the device. An operator can preselect such an operating mode manually or also automatically, for example by means of a communication between the beverage machine and the control device. It is made possible through this to adapt the filling to the respective required circumstances. In particular, it is possible to select the filling mode, if a normal beverage order, thus for example ordering a coffee, is intended, and to select the emptying mode, when the water tank is to be emptied completely as far as possible after a cleaning or descaling has ended or when turning off the device, whereby compromise of taste for the subsequent coffee order is avoided.

In the filling mode, provision is furthermore made for the control device to furthermore be designed to connect the water inlet to the water connection, when the first filling level has not been reached and has not been exceeded. If the filling mode has been preselected manually or automatically as operating mode, it is then ensured through this that a sufficient quantity of fresh water is always available for the next beverage order, without the need to manually control the filling level of the water tank.

Due to the fact that the device according to the invention furthermore encompasses a controllable drainage device for draining liquid from the water tank, a simplified emptying of the water tank, which can also be automated by means of the controllability of the drainage device, is also possible for discharging the cleaning or descaling liquid, respectively, or also for flushing the beverage machine, such as the coffee machine, for example.

For example, the drainage device can comprise a pump, which is embodied in such a manner that it can pump liquid from the water tank and is suitable to empty the water tank. Such a pump (hereinbelow also referred to as "emptying pump") can be embodied, for example, to pump liquid from the water tank continuously or in intervals, for example into a residual water bowl, which is suitable to accommodate the pumped liquid and to store it at least for a certain period of time.

The drainage device can also (as an alternative or in addition to a pump or emptying pump, respectively) include a controllable valve, which can be opened for draining a liquid from the water tank, for example into a residual water bowl. For example, such a valve can be arranged in an outlet of the water tank for draining the liquid, for example in a liquid drain line.

In the filling mode, provision can additionally be made in an advantageous manner for interrupting a connection of the water inlet to the water connection, when the first filling level has been reached or exceeded. It is ensured in this case that a sufficient quantity of fresh water is always available for the next beverage order, without the need to prevent an overflow (if applicable even manually) of the water tank, which is embodied as buffer tank.

In the emptying mode, provision can furthermore be made in this context for the control device to be designed to interrupt a connection of the water inlet to the water connection independent from the first filling level. If the emptying mode was preselected automatically or manually, a substantially complete emptying of the water reservoir, that is, of the water tank, is then possible through this, without always filling new fresh water into the water tank when the water filling level has been fallen below a minimum water filling level.

Provision can furthermore be made for the device to be capable of being operated in at least three different operating modes, for example also in a "flushing mode" in addition to one of the operating modes "filling mode" and "emptying mode", which have already been mentioned. In this case, provision can be made for the "at least one operating mode" to be capable of being selected from the operating modes "filling mode", "emptying mode" and "flushing mode", for example, so that the "at least one operating mode" is thus either a filling mode, an emptying mode or a "flushing mode" of the device.

By providing such a flushing mode, it is possible to fill the water tank systematically up to an arbitrary level, without resulting in a separation of the water connection from the water inlet when the first filling level is reached. In particular in response to cleaning or descaling, it is possible through this to be able to systematically provide for a larger quantity of flushing water for flushing the fluid system of the beverage machine, that is, in particular of the coffee machine, without refilling in the meantime. Simultaneously, cleaning of basically the entire inner volume of the water tank is enabled.

In this context, provision can also be made for the signal of the at least one filling level sensor to specify additionally, whether or not a second filling level of liquid inside the water tank has been reached or exceeded. This second filling level hereby identifies a larger liquid volume inside the water tank than the first filling level. For this purpose provision can in particular also be made for at least one further filling level sensor, which is arranged above a first filling level sensor.

A cleaning or descaling process can be varied to a greater extent due to the additional evaluation possibility of a second, higher filling level, which improves the cleaning or descaling performance, respectively.

In the flushing mode, provision can be made in this context for the control device to be designed to connect the water inlet to the water connection, when the second filling level has not been reached or exceeded and to interrupt a connection of the water inlet to the water connection, when the second filling level has been reached or exceeded.

In a flushing mode, this makes it possible to be able to provide a larger water volume for flushing the fluid system of the beverage machine, that is in particular of the coffee machine, in an automatic manner, which further reduces possible compromise of taste for the subsequent beverage order due to a more thorough cleaning.

As an alternative or in addition, provision can be made for the control device to be designed to also evaluate the second filling level in the filling mode, that is, to interrupt a connection of the water inlet to the water connection in the filling mode and, if applicable, to output a warning signal, when the second filling level has been reached or exceeded.

In the event that, due to a malfunction, for example of a separately provided filling level sensor for the first filling level, this first filling level is exceeded in normal operation, that is, in filling mode, and the second filling level is reached, provision is made in this manner for a safety shutdown of the water inlet, that is, a forced separation of the water connection from the water inlet. At the same time, a warning signal can be output, for example in the form of an optical or acoustic signal, whereby the operator of the beverage machine can be notified of the malfunction and the operator can find a remedy, if applicable.

In this context, provision can be made for the control device to furthermore be designed to control the drainage device continuously or in intervals according to the signal of the at least one filling level sensor and the at least one operating mode.

In the emptying mode, it is possible in particular hereby to carry out an emptying of the descaling liquid into the fluid systems of the beverage machine in intervals, thus for example the tube systems of the coffee machine, whereby a longer exposure time of the cleaning or descaling liquid, respectively, in these fluid systems is possible and the cleaning performance improves further as a consequence of this. A subsequent flushing of the fluid systems in a flushing mode, that is, after a largely complete emptying of the water tank and a subsequent filling with fresh water, can then take place in a continuous operation of the drainage device, so that the beverage machine is available more quickly again for a subsequent beverage order.

In addition, certain standard devices in the water tank encompass a water filter arranged upstream of the tank outlet. On principle, such a water filter arranged in the water tank is a water softener for at least partially softening or deionizing, respectively, the water. Due to the ion exchange technology, which is typically used, the filter performance depends on the basic lime content (carbonate hardness) of the fresh water, which can be filled into the water tank via the water inlet, and depends on the quantity of liquid, which passed through, so that the economically sensible point in time for replacing the filter (or a corresponding filter insert) is hard to determine in the case of common devices.

In this context, provision can now additionally be made for the at least one filling level sensor to not only output a signal to the control device with regard to a reaching of the filling level, but that it is additionally designed to determine a tank water hardness, preferably by means of a conductivity measurement (that is, by measuring the electrical conductivity of the water) and to transmit it to the control device by means of the at least one signal in response to a wetting with liquid. According to the tank water hardness, the control device is hereby furthermore designed to determine a change interval for a water filter, which is provided in the water tank, and to output a filter change signal, preferably when the determined change interval has passed. Said change signal characterizes a point in time, at which the water filter or, if applicable, a filter insert of the water filter should preferably be changed.

By measuring the water hardness in the water tank, a change interval can be determined, at which the filter or the filter insert, respectively, should be replaced so as to maintain the filter effect. The values of a flow meter or a time lapse can also be evaluated in the control device for this purpose.

In addition to the already mentioned advantages, this makes it possible in a simple manner to prompt the user of the beverage machine to carry out a water filter change (or the change of the filter insert) at an economically sensible point in time.

Provision can also be made in this context at an outlet of the water tank for the device to additionally encompass a water hardness sensor, which is designed to determine an "outlet water hardness" (that is, the hardness of the water, which leaves the tank through the outlet after flowing through the filter), preferably by means of a conductivity measurement (that is, by measuring the electrical conductivity of the water) in response to a wetting with liquid and to transmit it to the control device of the device and or to a different control device, for example to a control electronics of the beverage machine, by means of the at least one signal. In this case, the control device of the device or the control electronics of the beverage machine is furthermore designed to compare the respective measured tank water hardness to the respective measured outlet water hardness; for example, a difference between the measured outlet water hardness and the measured tank water hardness or a ratio between the measured outlet water hardness and the measured tank water hardness can be determined for this purpose.

Such a comparison between the tank water hardness and the outlet water hardness makes it possible to determine a "comparison change interval" for the water filter provided in the water tank, for example according to a ratio between the outlet water hardness and the tank water hardness (hereinbelow "water hardness ratio") or the difference between the outlet water hardness and the tank water hardness (hereinbelow "water hardness difference") and to preferably output the filter change signal when the certain "comparison change interval" has ended. In this context, "comparison change interval" is to identify a time interval, which was determined on the basis of a comparison between the tank water hardness and the outlet water hardness and the end of which characterizes a point in time, at which the water filter or a filter insert of the water filter, respectively, should preferably be changed.

Such a comparison between the tank water hardness and the outlet water hardness (e.g. by determining the above-mentioned "water hardness ratio" or the above-mentioned "water hardness difference") allows to draw a conclusion to the degree of wear of the filter. If this water hardness difference has dropped to a value, which is predetermined ahead of time or which can be predetermined, with an increasing wear of the filter or the filter effect, respectively, or if this water hardness difference becomes smaller than or equal to a predetermined value, the control device of the device or the control electronics of the beverage machine outputs information relating to the determined comparison change interval or a filter change signal to the user, by means of which an even more accurate determination of the economically sensible point in time for changing the water filter (or changing the insert) is possible. The control device of the device or the control electronics of the beverage machine can output information relating to the determined comparison change interval or a filter change signal to the user accordingly, when the determined water hardness ratio increases to a predetermined value or exceeds a predetermined value.

Using the device according to the invention, provision can also be made for an automated cleaning or descaling method, respectively, which is carried out by the control device and which encompasses the following steps:

activating the filling mode and filling the water tank up to a first filling level; adding cleaning agent, preferably decalcifier, into the water tank;

activating the emptying mode and emptying the water tank;

activating the flushing mode and filling the water tank up to the second filling level;

activating the emptying mode and emptying the water tank;

activating the filling mode and filling of the water tank up to the first filling level;

activating the emptying mode and emptying the water tank, preferably emptying in intervals.

BRIEF DESCRIPTION OF THE SEVERAL VIEWS OF THE DRAWINGS

An exemplary embodiment of the invention will be specified in more detail below by means of a drawing.

DETAILED DESCRIPTION

Figure 1:
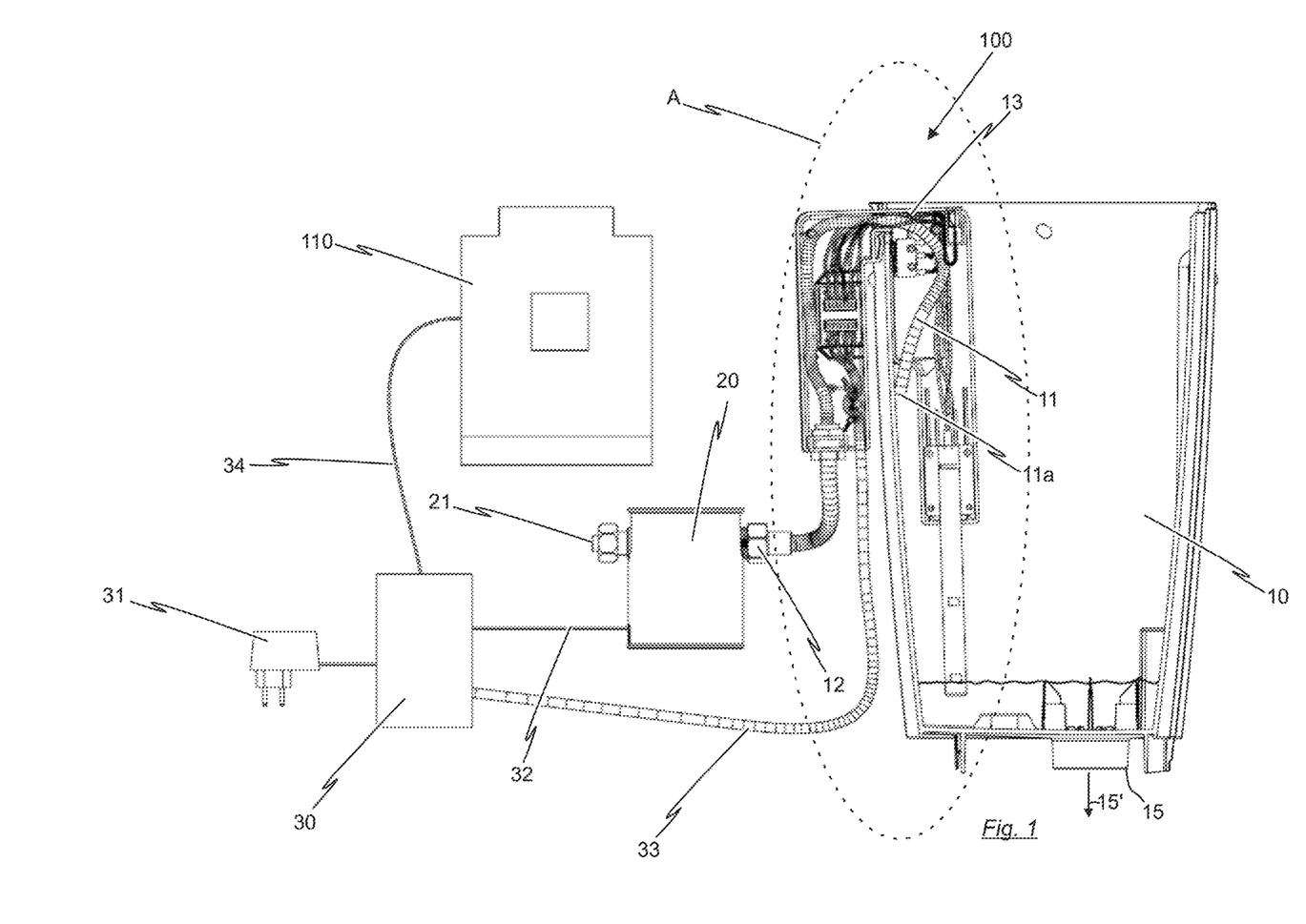
FIG. 1 shows a device according to the invention for providing liquid according to an exemplary embodiment in a schematic sectional view.

FIG. 1 shows a device 100 according to the invention for providing liquid for a beverage machine 110, in particular for a coffee machine or a coffee dispenser, according to an embodiment of the invention in a schematic sectional view.

Figure 2:
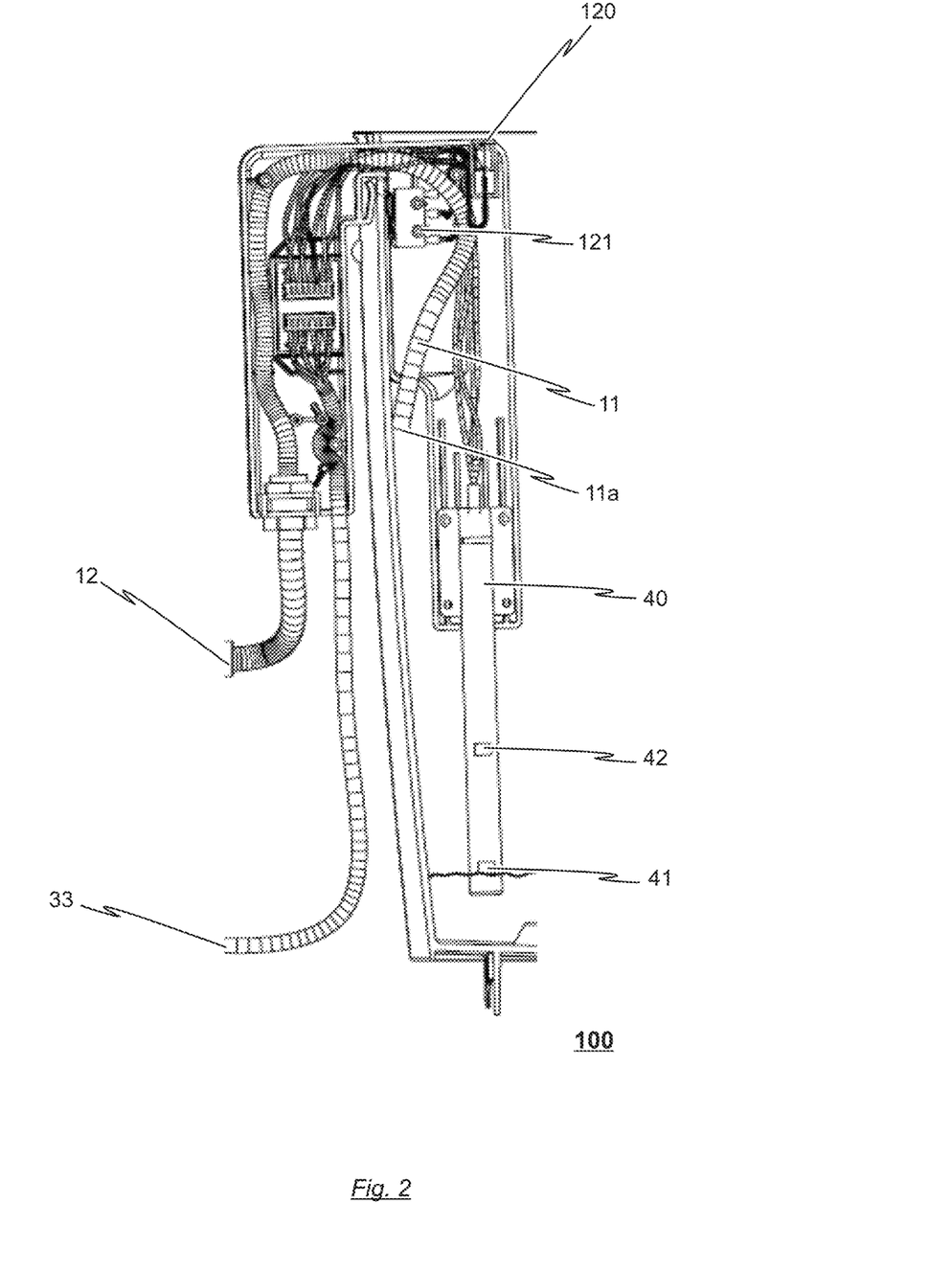
FIG. 2 shows the section from FIG. 1 identified with A.

The device 100 encompasses a water tank 10, into which a so-called mains water clip 13, which will be explained in more detail below with reference to FIG. 2, is clipped, as is shown on the left-hand side in FIG. 1.

A water inlet 11 is guided through the interior of the housing of the mains water clip 13 and projects into the interior of the water tank 10 with its inlet opening 11a. On the outer side, the hose of the water inlet 11 is provided with a valve connection 12, which, in turn, is connected to a side of a hydraulic servo valve 20.

The hydraulic servo valve 20 is embodied in a controllable manner and is designed in such a manner that if suitable signals are present on its control line 32, it can establish and separate or interrupt, respectively, a (fluid) connection to a water connection 21, which is connected directly to the potable water supply, for example. It goes without saying that the hydraulic servo valve 20 can also be replaced by a valve of a different design.

The control line 32 is connected to a control device 30, which can be embodied, for example, in the form of a mini hub as central interface.

The control device 30 furthermore encompasses a status line 34 to the beverage machine 110, which makes it particularly simple to provide for a manual selecting option for the operating mode at a user interface of the beverage machine 110 (which is typically present in any event for operating the beverage machine 110 by a user). A corresponding signal, which characterizes the operating mode, can then be transmitted from the beverage machine 110 via the status line 34 to the control device 30.

The control device 30 is furthermore connected to a signal line 33, which leads at least in parts through the housing of the mains water clip 13 to a first filling level sensor 41 and a second filling level sensor 42, which are arranged at a sensor probe 40, and which establishes an electrical signal connection to the filling level sensors 41, 42. Sensor probe 40, first filling level sensor 41 as well as second filling level sensor 42 can be seen in the enlarged illustration of the mains water clip 13 in FIG. 2.

Additional information, which characterizes whether the mains water clip 13 was properly attached to the water tank 10, is furthermore transmitted to the control device 30 via the signal line 33. For this purpose, the mains water clip 13 encompasses a detection switch 121, which transmits a corresponding signal to the control device 30. In the event that the mains water clip 13 was not mounted properly to the water tank 10, provision is made for the control device 30 to prevent a filling of the water tank 10, that is, an opening of the hydraulic servo valve 20. An optical signal is output simultaneously to the operator, in that the control device 30 activates an LED 120 via the signal line 33.

The first filling level sensor 41 is arranged on a first water filling level and outputs a corresponding signal to the control device 30 via the signal line 33, when said first filling level sensor is wetted by a liquid, that is, as soon as the filling level assigned to it inside the water tank 10 is reached or exceeded. The second filling level sensor 42 located thereabove also transmits a signal in a corresponding manner to the control device 30 via the signal line 33 as soon as a second filling level, that is, a higher filling level inside the water tank 10 is reached or exceeded.

The sensor probe 40 is arranged in a height-adjustable manner by means of a suitable adjusting device and thus allows for an adjustment of the filling levels of the first filling level sensor 41 and of the second filling level sensor 42 within certain limits.

While a product is obtained as well as during continuing operation of the beverage machine, that is, in a filling mode of the beverage machine, such as the coffee machine, for example, the control device 30 controls the hydraulic servo valve 20 in such a manner that a refilling to the water level, which is specified by the first filling level sensor 41—the so-called operational point—always takes place in intervals. When the water level in the water tank 10 falls below this first filling level, the first filling level sensor 41 transmits such a decrease of the water level to the control device 30 via the signal line 33, in response to which the control device 30 opens the hydraulic servo valve 20 and thus establishes a connection between the water inlet 11 and the water connection 21, until the sensor supplies a corresponding signal again in response to reaching the first filling level, in response to which the hydraulic servo valve 20 is closed again.

Both filling level sensors 41, 42 are hereby not limited to a certain measuring method; nonetheless, the resistance is preferably measured between two electrically conductive measuring surfaces, which are arranged on the round measuring stick of the sensor probe 40 so as to be flush therewith, in that the signal jump of the conductivity of the water and of the air is evaluated by the electronics of the control device 30 or an electronics integrated in the filling level sensors 41, 42, respectively. It is a particular advantage here that this sensor alternative can be cleaned easily of possible lime residues by means of common cleaning agents.

Depending on the operating mode, a control by the control device 30 takes place in such a manner that a filling of the water tank 10 is either carried out until the first filling level is reached at the first filling level sensor 41 or until the second filling level at the second filling level sensor 42 is reached or that no refilling takes place.

As is illustrated in FIG. 1, the tank 10 has an outlet 15, through which (fresh) water or a different liquid can be released from the water tank 10. An arrow 15' in FIG. 1 thereby suggests the flow direction of a liquid, which flows through the outlet 15.

For emptying the water tank 10 in a controlled manner, the device 100 according to the embodiment of the invention as illustrated in FIGS. 1 and 2 can be equipped with a drainage device, which is not illustrated in FIGS. 1 and 2, for draining liquid from the water tank, wherein the drainage device can be controlled so as to drain the respective liquid continuously or in intervals from the water tank 10, at least during a certain period of time.

Such a drainage device can comprise an emptying pump, for example, which can be controlled in such a manner that it can pump liquid from the water tank continuously or in intervals, for example into a residual water bowl (not illustrated in FIGS. 1 and 2), wherein this pumping can take place, for example, through the outlet 15 (or, in the alternative, in a different way). For this purpose, the emptying pump can be a part of the device 100, for example, or can be arranged at the device 100 and can be controlled by the control device 30, for example. In the alternative, a pump, which is integrated in the beverage machine 110 and which is designed for transporting water or a different liquid in a fluid system of the beverage machine (110) (not illustrated in FIGS. 1 and 2, but illustrated in FIG. 3 and described in context with FIG. 3) (for supplying the beverage machine 110 with water), can also serve as such an emptying pump. This pump of the beverage machine 110 can be controlled accordingly by a control electronics 30a of the beverage machine 110 (illustrated in FIG. 3) and can be connected to the tank 10 in such a manner that water or a different liquid can be pumped from the tank 10 by means of this pump, for example into a water outlet (not shown in FIGS. 1-2), for example into a residual water bowl of the beverage machine 110. Provision can hereby additionally also be made for such an emptying pump to be connected to a flow meter 50 (FIG. 3) in the beverage machine 110, so that a monitoring is additionally possible to ascertain, at what point in time the water tank 10 was emptied substantially completely.

Due to the design according to the illustrated embodiment, a largely automated descaling of the water tank 10 is possible, for example. The only requirement for this is to fill a defined quantity of decalcifier concentrate into the water, which is present in the water tank 10, and to change the operating mode of the device 100, for example after operating a button on the beverage machine 110, and to start an automatic descaling process.

The addition of fresh water is prevented in a purposeful manner during this descaling process, in that the control device 30 always controls the hydraulic servo valve 20 in such a manner that there is no connection between the water inlet 11 and the water connection 21. After the emptying pump has emptied the water tank 10 substantially completely, the fresh water addition is released up to a water level, which corresponds to the arrangement of the second filling level sensor 42. This water quantity is first guided into a corresponding drain system, for example a residual water bowl, by means of the emptying pump, whereby the water tank is flushed. The fresh water addition is then released up to the water level, which corresponds to the arrangement of the first filling level sensor 41. The complete fluid system of the beverage machine, thus for example of the coffee machine, is then flushed with this fresh water.

It goes without saying that it is possible to integrate the entire device 100 for providing liquid or also only parts thereof, such as the water tank 10, for example, in the beverage machine 110 and to thus provide a beverage machine 110, in particular a coffee machine, having the device 100 according to the invention, in the case of which only the water connection 21 of the device 100 and, if applicable, a separate voltage supply 31 are guided to the outside.

Figure 3:
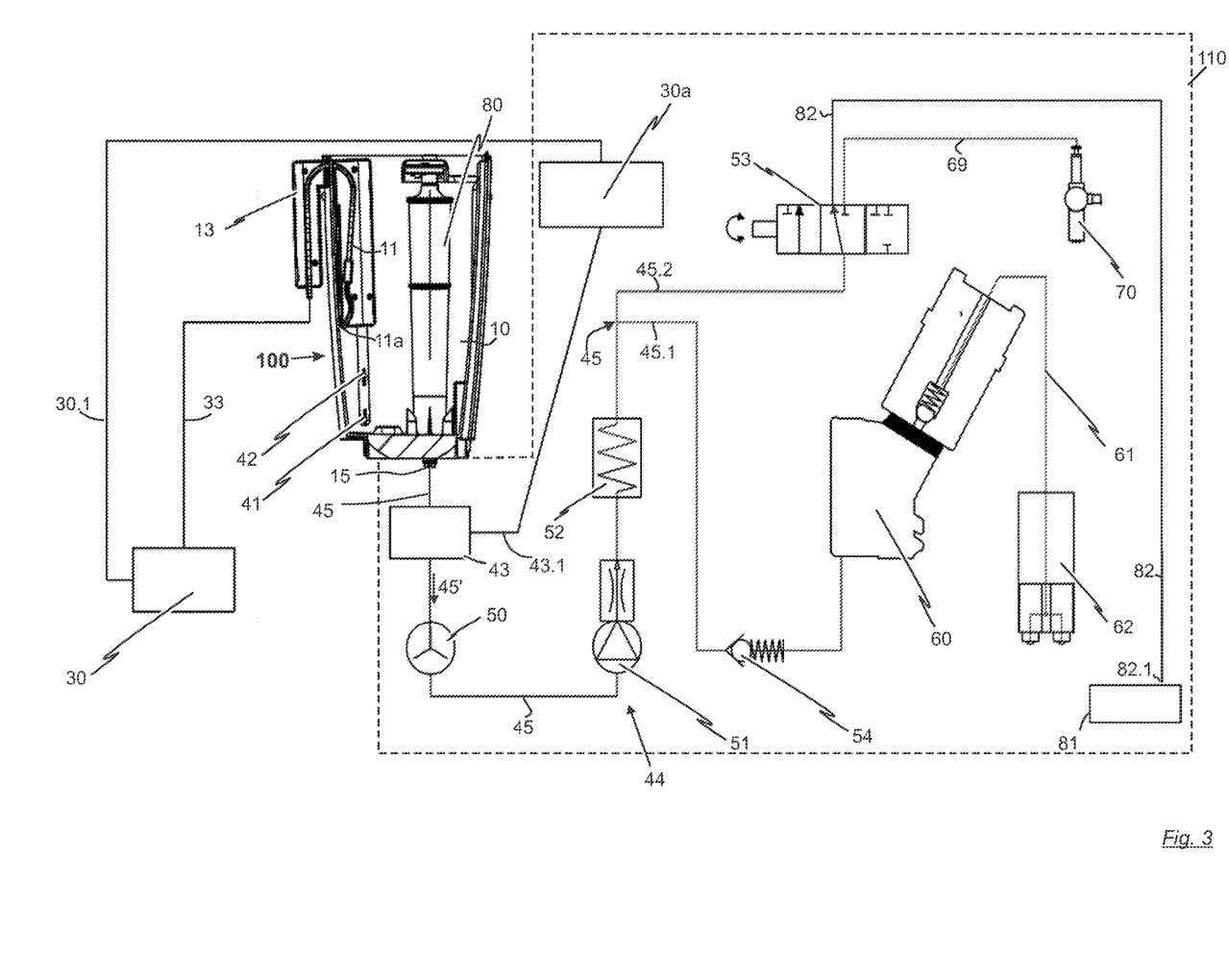
FIG. 3 shows a device according to the invention for providing liquid according to a further exemplary embodiment in a schematic sectional view.

FIG. 3 shows a device according to the invention for providing liquid according to a further exemplary embodiment in a schematic sectional view. The exemplary embodiment according to FIG. 3 comprises, among others, the device 100 according to FIGS. 1 and 2 having a water tank 10 and is illustrated in combination with a beverage machine 110 according to FIG. 1, which, in the case at hand, is embodied as coffee machine or coffee dispenser, respectively.

It is important to note that even though a water inlet illustrated in FIGS. 1 and 2 for supplying water into the tank 10 (via a water connection 21 and a hydraulic servo valve 20, which is embodied so as to be capable of being controlled) is not illustrated explicitly in FIG. 3, a corresponding water inlet for supplying water into the water tank 10 is present in the case of the exemplary embodiment according to FIG. 3 and is embodied substantially analogously to the water inlet illustrated in FIG. 1 (with regard to its function and its design). According to FIG. 3, a mains water clip 13, which corresponds to the mains water clip 13 according to FIG. 2, is clipped accordingly into the water tank 10 of the device 100.

As is illustrated in FIG. 3, the tank 10 encompasses an outlet 15 through which (fresh) water or a different liquid can be output from the tank 10, wherein a filter 80, through which the water located in the tank 10 or the respective liquid, respectively, must flow in each case to reach the outlet 15, is positioned in the tank 10 at the outlet 15. In the illustrated exemplary embodiment, the filter 80 encompasses a filter insert in the form of an ion exchanger, which is embodied to deionize at least a portion of the water, which flows through the filter 80, or of the liquid, which flows through the filter 80, respectively, and to descale it in this manner.

As is suggested in FIG. 3, the beverage machine 110 comprises a water line 45, which is connected to the outlet 15 at one end, so that water or a different liquid can flow from the tank 10 into the water line 45 and can be distributed through the water line 45 in the beverage machine 110. Arranged in series behind one another in the flow direction 45' of the water or of the respective liquid, respectively, a pump 51 for transporting the water in the water line 45 in the flow direction 45' and a continuous-flow heater 52 are integrated in the water line 45. The continuous-flow heater 52 is designed to heat the water, which is transported to the continuous-flow heater 52 by means of the pump 51, wherein the continuous-flow heater 52 can heat the water to different temperatures, so that the continuous-flow heater 52 either creates hot water or steam in the water line 45. As is also suggested in FIG. 3, the water line 45 is branched downstream from the continuous-flow heater 52 with regard to the flow direction 45' of the water in a first branch 45.1 of the water line 45 and a second branch 45.2 of the water line 45, wherein the first branch 45.1 of the water line 45 serves the purpose of supplying hot water created in the continuous-flow heater 45 to a brewing unit 60 via a nonreturn valve 54 for brewing coffee, and the second branch 45.2 of the water line 45 serves the purpose of either supplying steam created in the continuous-flow heater 52 via a control valve 53 to a steam nozzle 70 via a steam line 69, or to supply a liquid from the tank 10 via the control valve 53 to a liquid outlet line 82, which makes it possible to allow the liquid, which is in each case supplied to the liquid outlet line 82 (for example water or a cleaning agent or decalcifier) via an outlet 82.1 of the liquid outlet line 82, for example into a residual water bowl 81.

As is suggested in FIG. 3, the control valve 53 encompasses three different positions and is connected to the second branch 45.2 of the water line 45, the steam line 69 and the liquid outlet line 82 in such a manner that, in a first position of the control valve 53, the second branch 45.2 of the water line 45 is in fluid connection with the steam line 69 and the steam nozzle 70 and, in a second position of the control valve 53 (as illustrated in FIG. 3), the second branch 45.2 of the water line 45 is in fluid connection with the liquid outlet line 82 or the residual water bowl 81, respectively, while, in the third position of the control valve 53, the second branch 45.2 of the water line 45 is connected in such a manner that there is neither a fluid connection between the second branch 45.2 of the water line 45 and the steam line 69, nor a fluid connection between the second branch 45.2 of the water line 45 and the liquid outlet line 82 or the residual water bowl 81, respectively. In the example at hand, the control valve 53 is embodied in such a manner that it can be controlled by means of a control electronics in such a manner that it can assume each of the three above-mentioned positions.

As can furthermore be seen from FIG. 3, the beverage machine 110 comprises a control electronics 30*a* for controlling an operation of the beverage machine 110. By correspondingly controlling the pump 51, the continuous-flow heater 52, the control valve 53 and the brewing unit 60, the control electronics 30*a* is thereby embodied, for example, so as to prompt hot water to be supplied to the brewing unit 60, so that the brewing unit 60 can brew a coffee beverage and can supply this coffee beverage via a coffee dispensing line 61 to a coffee outlet 62 for dispensing the coffee beverage.

By correspondingly controlling the pump 51, the continuous-flow heater 52 and the control valve 53, the control electronics 30*a* is also embodied to prompt a portion of steam to be supplied to the steam nozzle 70, wherein the steam nozzle 70 can be embodied, for example, to allow the steam to escape from an outlet opening, or can serve the purpose of heating milk or creating milk froth.

By correspondingly controlling the pump 51, the continuous-flow heater 52 and the control valve 53, the control electronics 30*a* is furthermore also embodied to prompt a liquid to be capable of being pumped from the tank 10 and to be capable of discharging via the liquid outlet line 82, for example via the output 82.1 into the residual water bowl 81. For this purpose, the control valve 53 can be brought into the position illustrated in FIG. 3, so that a fluid connection exists between the second branch 45.2 of the water line 45 and the liquid outlet line 82. Liquid can subsequently be pumped from the tank 10 via the outlet 15, the water line 45, the control valve 53 and the liquid outlet line 82 by means of the pump 51, so that the liquid, which is pumped thereby, can collect in the residual water bowl 81.

In the instant example, the control electronics 30*a* of the beverage machine 110 can control the device 100 in such a manner that the device 100 is operated in an emptying mode, in which the tank 10 can be emptied completely or partially.

In the emptying mode, the control device 30 controls the water inlet 11 in such a manner that a connection of the water inlet 11 to the water connection 21 (FIG. 1) is interrupted, namely independent from the filling level of the tank 10, that is, independent from signals of the filling level sensors 40 and 41. This has the effect that fresh water cannot flow via the water inlet 11 into the tank 10. If liquid is subsequently pumped from the tank 10 via the outlet 15, the water line 10, the control valve 53 and the liquid outlet line 82 by means of the pump 51 as described above, the water tank can be emptied completely or partially without fresh water being able to flow into the tank 10 via the water inlet 11. Liquid is drained from the tank 10 by pumping liquid and the filling level of the tank 10 can be lowered to any level in this manner. If necessary, the tank 10 can be emptied completely.

Subsequently, the tank 10 can be filled with cleaning agent in order to clean the tank 10 (as already described in context with FIGS. 1 and 2).

Those components of the device illustrated in FIG. 3, which provide for a drainage of liquid from the tank 10, form a "drainage device" in terms of the invention, to which reference is made in FIG. 3 with reference numeral 44. The drainage device 44 according to FIG. 3 comprises at least the pump 51. The water line 45 and liquid outlet line 82 can furthermore be components of the drainage device 44.

According to this exemplary embodiment, the first filling level sensor 41 of the mains water clip 13 is also designed to determine information relating to the water hardness degree of the water located in the tank 10 in response to wetting (hereinbelow "tank water hardness") and to transmit it to the control device 30 (for example via a signal line 33, which is illustrated in FIG. 3). It goes without saying that it is also possible to additionally or alternatively design the second filling level sensor 42 accordingly, so that it can also determine information relating to the water hardness degree of the water located in the tank 10 (tank water hardness) and can transmit it to the control device 30 (for example via the signal line 33 illustrated in FIG. 3).

As can be seen in FIG. 3, the control device 30 of the device 100 is connected to the control electronics 30*a* of the beverage machine 110 via a signal line 30.1, so that signals or data, respectively, can be transmitted between the control device 30 and the control electronics 30*a* via the signal line 30.1. The control device 30 is embodied, for example, to transmit measuring values for the tank water hardness determined by the first filling level sensor 41 and/or for the tank water hardness determined by the second filling level sensor 42 to the control electronics 30*a* of the beverage machine 110.

As is suggested in FIG. 3, a water hardness sensor 43, which outputs information relating to the water hardness degree of the water dispensed at the outlet 15 (hereinbelow "outlet water hardness") to the control electronics 30*a* via a signal line 43.1, is additionally positioned in the water line 45 of the beverage machine 110 in the vicinity of the outlet 15 of the tank 10. In the case of a correspondingly high tank water hardness, this dispensed water should have a lower water hardness than the water in the tank 10 due to passing through the filter 80.

In addition, the control electronics 30*a* of the beverage machine 110 is now designed to compare this information from the sensors 41, 42, 43 relating to the water hardness and to output a signal to a user if the difference between outlet water hardness and tank water hardness falls below a certain (predetermined) value, for example by means of an LED, which is not illustrated, or by means of a screen or a different display, in order to display to the user that the filter 80 deionizes or descales, respectively, the water, which flows through the filter 80, insufficiently and does not attain an acceptable filter effect (with regard to the descaling), so that the filter 80 should be replaced by a different filter, which ensures that, prior to entering into the water line 45 of the beverage machine 110, the water has at best a lime content, which falls below a predetermined (maximum) value.

FIG. 3 illustrates the device 100 and the beverage machine 110 as separate units. It is important to point out that the device 100 can also be an integral part of the beverage machine 110. The control device 30 of the device 100 is illustrated in FIG. 3 as a separate unit, which is spatially separated from the control electronics 30a of the beverage machine 110. It is important to point out that the control device 30 can also be realized as integral part of the control electronics 30a. In this case, the first filling level sensor 41 and the second filling level sensor 42 would be connected directly to the control electronics 30a of the beverage machine 110 via the signal line 33. All of the functions for controlling the device 100, which are assigned to the control device 30 in the above illustration or which can be realized by means of the control device 30, respectively, can accordingly be implemented in the control electronics 30a of the beverage machine 110 or can be realized by means of the control electronics 30a of the beverage machine 110, respectively.

The invention claimed is:

1. A coffee machine comprising a device for providing liquid for the coffee machine, wherein the device comprises:
   a water tank having at least one water inlet for filling the water tank, said water inlet being configured to be connected in a controllable manner to a water connection, in particular to an overpressure water connection and preferably to a potable water supply, and having an outlet for letting a liquid out of the water tank;
   a control device for controlling the water inlet being configured to be connected in a controllable manner; and
   at least one filling level sensor for generating a signal, which indicates at least whether or not a first filling level of liquid inside the water tank has been reached or exceeded,
   and wherein the coffee machine further comprises:
   a water line, which is connected to the outlet of the water tank in such a manner that a liquid, which is let out of the tank through the outlet, is enabled to drain through the water line,
   a continuous-flow heater and
   a brewing unit for brewing coffee, which is connected to the water tank via the water line and the continuous-flow heater in such a manner that water from the water tank is enabled to be supplied to the brewing unit through the water line and the continuous-flow heater, so as to make it possible to brew coffee,
   wherein the at least one filling level sensor is configured to be connected or is connected to the control device to transmit the signal, and wherein the control device is designed to control the water inlet according to the signal of the at least one filling level sensor and according to at least one operating mode,
   wherein the operating mode is either a filling mode or an emptying mode,
   wherein the device further comprises a controllable drainage device for draining liquid from the water tank through the outlet,
   wherein, in the filling mode, the control device is furthermore designed to connect the water inlet to the water connection when the first filling level has not been reached and has not been exceeded, and in the emptying mode, to interrupt a connection of the water inlet to the water connection independent from the first filling level, and
   wherein the control device is designed to prompt the drainage device to drain liquid from the water tank by controlling the drainage device,
   wherein, in the emptying mode, the control device is designed to interrupt a connection of the water inlet to the water connection and to prompt the drainage device to completely drain a quantity of liquid contained in the tank (10) through the outlet and to allow it to discharge through the water line and the continuous-flow heater, so that a complete emptying of the water tank takes place.

2. The coffee machine according to claim 1, wherein the drainage device comprises a pump, which is configured to pump liquid from the water tank continuously or in intervals.

3. The coffee machine according to claim 1, wherein, in the filling mode, the control device is furthermore designed to interrupt a connection of the water inlet to the water connection, when the first filling level has been reached or exceeded.

4. The coffee machine according to claim 1, wherein the at least one operating mode is either a filling mode, an emptying mode or a flushing mode.

5. The coffee machine according to claim 1, wherein the signal of the at least one filling level sensor additionally specifies whether or not a second filling level of liquid inside the tank has been reached or exceeded, wherein the second filling level identifies a larger volume than the first filling level.

6. The coffee machine according to claim 5, wherein, in the flushing mode, the control device is designed to connect the water inlet to the water connection, when the second filling level has not been reached and has not been exceeded, and wherein, in the flushing mode, the control device is furthermore designed to interrupt a connection of the water inlet to the water connection, when the second filling level has been reached or exceeded.

7. The coffee machine according to claim 5, wherein, in the filling mode, the control device is designed to interrupt a connection of the water inlet to the water connection and to output a warning signal when the second filling level has been reached or exceeded.

8. The coffee machine according to claim 1, wherein the control device is furthermore designed to control the drainage device according to the signal of the at least one filling level sensor and the at least one operating mode continuously or in intervals.

9. The coffee machine according to claim 1, comprising a valve, which is configured to be controlled by the control device and which is designed to establish a fluid connection between the water inlet and the water connection and/or to separate a fluid connection between the water inlet and the water connection.

10. The coffee machine according to claim 1, wherein the at least one filling level sensor is additionally designed to determine a tank water hardness in the water tank in response to wetting with liquid and to transmit information relating to the tank water hardness to the control device by means of the one signal, comprising an outlet for letting a liquid out of the water tank and comprising a filter for deionizing or descaling a liquid, which is let out from the water tank through the outlet.

11. The coffee machine according to claim 10, comprising an additional water hardness sensor, which is arranged at the outlet and which is designed to determine an outlet water hardness in response to a wetting with the liquid, which is let out through the outlet.

12. The coffee machine according to claim 11, comprising a control electronics,
    wherein the additional water hardness sensor is configured to transmit information relating to the outlet water hardness to the control electronics by means of a signal,
    wherein the control electronics is configured to compare the information relating to the outlet water hardness to the information relating to the tank water hardness and to provide a signal, if the difference between the tank water hardness and the outlet water hardness is smaller than or equal to a predetermined value.

13. The coffee machine according to claim 12, wherein the control electronics is configured to control an operation of the coffee machine and the control device is an integral part of the control electronics.

\* \* \* \* \*